(12) United States Patent
Cui

(10) Patent No.: US 8,462,450 B2
(45) Date of Patent: Jun. 11, 2013

(54) OPTICAL APPARATUS

(75) Inventor: Changzhi Cui, Utsunomiya (JP)

(73) Assignee: Canon Kabushiki Kaisha (JP)

( * ) Notice: Subject to any disclaimer, the term of this patent is extended or adjusted under 35 U.S.C. 154(b) by 0 days.

(21) Appl. No.: 13/193,853

(22) Filed: Jul. 29, 2011

(65) Prior Publication Data
US 2012/0026610 A1  Feb. 2, 2012

(30) Foreign Application Priority Data

Jul. 30, 2010  (JP) ................................. 2010-171770

(51) Int. Cl.
*G02B 7/02* (2006.01)
(52) U.S. Cl.
USPC ............ 359/823; 359/824; 359/811; 359/813
(58) Field of Classification Search
USPC .................. 359/694–704, 811–830
See application file for complete search history.

(56) References Cited

U.S. PATENT DOCUMENTS

| 2006/0002696 | A1* | 1/2006 | Onishi et al. ..................... 396/85 |
| 2007/0159702 | A1* | 7/2007 | Latenstein Van Voorst et al. ............................. 359/813 |
| 2012/0062789 | A1* | 3/2012 | Sasaki .......................... 348/373 |

FOREIGN PATENT DOCUMENTS

| DE | 1 294 062 B | 4/1969 |
| GB | 953865 A | 4/1964 |
| JP | 58-154822 A | 9/1983 |
| JP | 05-313055 A | 11/1993 |

OTHER PUBLICATIONS

Extended European Search Report for EP 11006173.6, mailing date Nov. 16, 2011.

* cited by examiner

*Primary Examiner* — Mohammed Hasan
(74) *Attorney, Agent, or Firm* — Rossi, Kimms & McDowell LLP

(57) ABSTRACT

The optical apparatus includes a first optical unit and a second optical unit that are movable in an optical axis direction, actuators that respectively move the first and second optical units in the optical axis direction, and a linking mechanism that is configured to link the first and second optical units with each other such that, in a state where the optical axis direction is tilted with respect to a horizontal direction and thereby an obliquely downward force caused by gravity acts on each of the first and second optical units in an obliquely downward direction, one of the first and second optical units works as a counterweight to provide an obliquely upward force acting on the other of the first and second optical units in an obliquely upward direction.

4 Claims, 7 Drawing Sheets

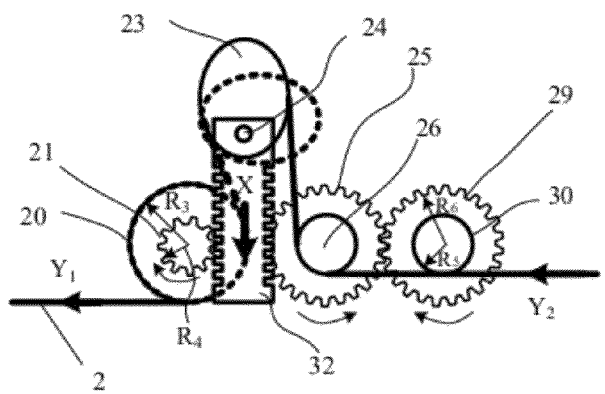
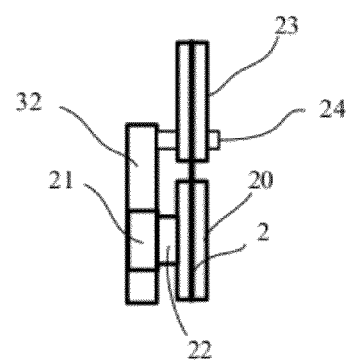
FIG. 5A  FIG. 5B
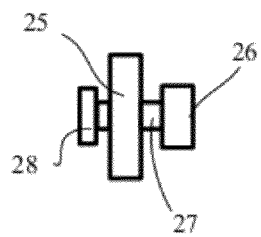
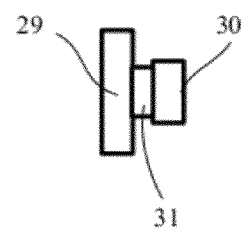
FIG. 5C  FIG. 5D
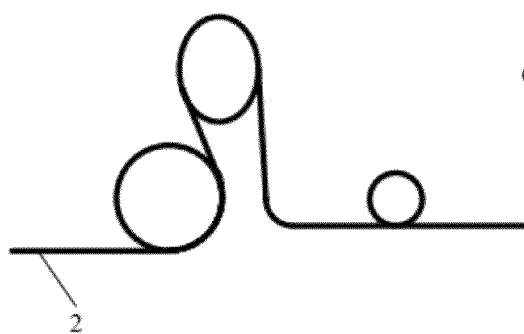
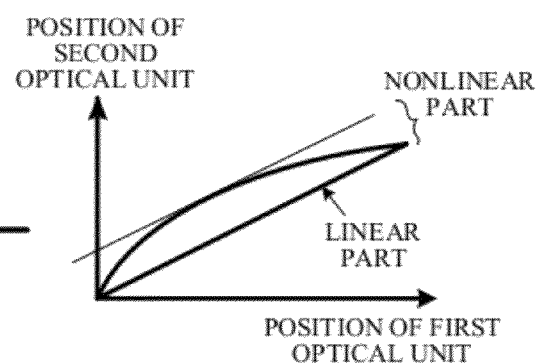
FIG. 5E  FIG. 5F

OPTICAL APPARATUS

BACKGROUND OF THE INVENTION

1. Field of the Invention

The present invention relates to an optical apparatus capable of preventing movable optical units from being moved by gravity in a state of being tilted from a horizontal posture.

2. Description of the Related Art

When an optical apparatus including optical units movable in an optical axis direction such as a lens unit and an iris unit is used in a state (tilted use state) where the optical axis direction is tilted with respect to a horizontal direction, an obliquely downward force caused by gravity acts on each optical unit in an obliquely downward direction, which increases a load of each actuator driving each optical unit.

Japanese Patent Laid-Open No. 58-154822 discloses an optical apparatus provided with a balancer cam inside a driving cam barrel that moves an optical unit in an optical axis direction in order to avoid a natural displacement of the optical unit due to gravity in the above-mentioned tilted use state. In the apparatus, balancing a force acting on the driving cam barrel due to a weight of the balancer cam with a force acting on the driving cam barrel from the optical unit by the gravity suppresses rotation of the driving cam barrel to prevent sliding of the optical unit.

Moreover, Japanese Patent Laid-Open No. 05-313055 discloses an optical apparatus that changes electric power (electric current value) to be applied to an actuator driving an optical unit according to a tilt angle of the optical apparatus and a movement direction of the optical unit in the tilted use state.

However, the optical apparatus disclosed in Japanese Patent Laid-Open No. 58-154822 requires the balancer cam having a weight generating a same force as the force acting on the driving cam barrel from the optical unit by the gravity, which significantly increases a weight of the entire apparatus.

Moreover, the optical apparatus disclosed in Japanese Patent Laid-Open No. 05-313055 requires increase of the electric power continuously applied to the actuator in the tilted use state in order to avoid the movement of the optical unit in the obliquely downward direction due to the gravity, which increases power consumption of the actuator and an amount of heat generation. The generated heat may deform members around the actuator.

SUMMARY OF THE INVENTION

The present invention provides an optical apparatus capable of suppressing the increase of the load of the actuator and the sliding of the optical unit by the gravity in the tilted use state without significantly increasing the weight of the apparatus and the electric power to be applied to the actuator.

The present invention provides as one aspect thereof an optical apparatus including a first optical unit and a second optical unit that are movable in an optical axis direction, actuators that respectively move the first and second optical units in the optical axis direction, and a linking mechanism that is configured to link the first and second optical units with each other such that, in a state where the optical axis direction is tilted with respect to a horizontal direction and thereby an obliquely downward force caused by gravity acts on each of the first and second optical units in an obliquely downward direction, one of the first and second optical units works as a counterweight to provide an obliquely upward force acting on the other of the first and second optical units in an obliquely upward direction.

Further features of the present invention will become apparent from the following description of exemplary embodiments with reference to the attached drawings.

BRIEF DESCRIPTION OF THE DRAWINGS

FIGS. 5A to 5F show a first example of the configuration of a length adjustment mechanism of the optical apparatus of Embodiment 4.

DESCRIPTION OF THE PREFERRED EMBODIMENTS

Exemplary embodiments of the present invention will hereinafter be described with reference to the accompanying drawings.

Embodiment 1

Figure 1:
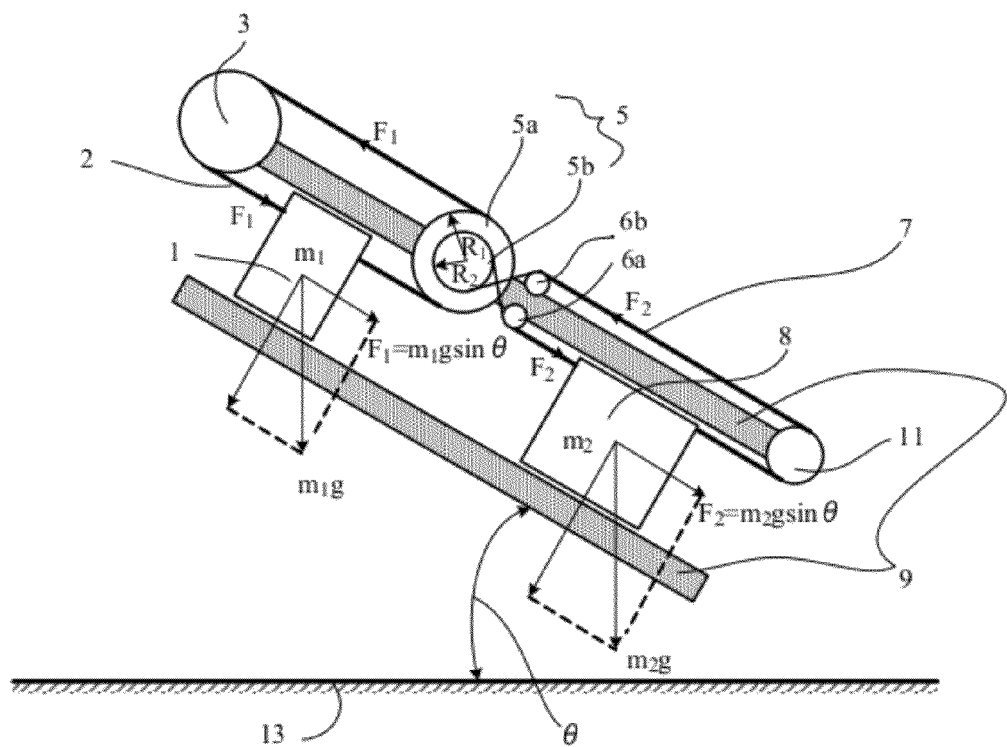
FIG. 1 shows the configuration of an optical apparatus that is Embodiment 1 of the present invention.

FIG. 1 shows the configuration of an optical apparatus that is a first embodiment (Embodiment 1) of the present invention. A first optical unit 1 and a second optical unit 8 are respectively moved by driving forces from actuators (not shown) along a guide 9 attached to a fixed member (not shown) so as to become closer to and further away from each other in an optical axis direction while maintaining a predetermined positional relationship. FIG. 1 shows a state (that is, a tilted use state) where the optical apparatus is used in a posture in which the optical axis direction is tilted with respect to a horizontal direction. In the following description, an object side in the optical axis direction is referred to as a "front side", and an image side is referred to as a "rear side".

A first flexible linking member (first wound linking member) 2 is wound around a pulley 3 rotatably held at a front part of the fixed member and a large diameter pulley 5a of a two-step pulley 5 rotatably held at an optical-axis-direction intermediate part of the fixed member. One end and another end of the first flexible linking member 2 are respectively connected to a front part and a rear part of the first optical unit 1.

A second flexible linking member (second wound linking member) 7 is wound around a pulley 11 rotatably held at a rear part of the fixed member, guide pulleys 6a and 6b and a small diameter pulley 5b of the two-step pulley 5. One end and another end of the second flexible linking member 7 are respectively connected to a front part and a rear part of the second optical unit 8.

The second flexible linking member 7 crosses between the small diameter pulley 5*b* and the guide pulleys 6*a* and 6*b*, which rotates the pulley 11 and the small diameter pulley 5*b* (two-step pulley 5) in rotation directions reverse to each other. The large diameter pulley 5*a* and the small diameter pulley 5*b* of the two-step pulley 5 respectively correspond to a first rotatable member and a second rotatable member that are rotatable integrally with each other.

Any flexible linking member may be used such as a wire or a belt as long as it is capable of transmitting a driving force and has a necessary strength. This also applies to other embodiments which will be described later.

Thus, the first optical unit 1 and the second optical unit 8 are connected to each other through the first and second flexible linking members 2 and 7 and the two-step pulley 5. When the optical apparatus is in the tilted use state, an obliquely downward force caused by gravity acts on each of the first and second optical units 1 and 8 in a downward tilting direction. In this state, a linking mechanism including the first and second flexible linking members 2 and 7 and the two-step pulley 5 links the first and the second optical units 1 and 8 with each other such that one of the first and second optical units 1 and 8 becomes a counterweight to provide an obliquely upward force acting on the other of the first and second optical units 1 and 8 in an obliquely upward direction.

That is, appropriate setting of a ratio of diameters (radii in this embodiment) $R_1$ and $R_2$ of the large and small diameter pulleys 5*a* and 5*b* in the two-step pulley 5 balances component of forces $F_1$ and $F_2$ of own weights of the first and second optical units 1 and 8 acting thereon in the downward tilting direction.

Next, description will be made of the principle of a counterweight function realized by the above-described linking mechanism. In the following description, g denotes gravitational acceleration.

In a state where the optical apparatus (optical axis direction) is tilted with respect to a horizontal plane 13 by an angle θ as shown in FIG. 1, the following component of force $F_1$ of the own weight $m_1 g$ of the first optical unit 1 acts thereon in the downward tilting direction along the guide 9:

$$F_1 = m_1 g \sin\theta \quad (1).$$

Similarly, the following component of force $F_2$ of the own weight $m_2 g$ of the second optical unit 8 acts thereon in the downward tilting direction along the guide 9:

$$F_2 = m_2 g \sin\theta \quad (2).$$

The component of force $F_1$ acts as a tension on the first flexible linking member 2 to generate a counterclockwise moment $T_1$ on the large diameter pulley 5*a* whose radius is $R_1$. The moment $T_1$ is expressed by the following expression:

$$T_1 = F_1 R_1 = m_1 g R_1 \sin\theta \quad (3).$$

Similarly, the component of force $F_2$ acts as a tension on the second flexible linking member 7 to generate a clockwise moment $T_2$ of the small diameter pulley 5*b* whose radius is $R_2$. The moment $T_2$ is expressed by the following expression:

$$T_2 = F_2 R_2 = m_2 g R_2 \sin\theta \quad (4).$$

In other words, the counterclockwise moment $T_1$ and the clockwise moment $T_2$ act on the two-step pulley 5. If the two-step pulley 5 does not rotate, the first optical unit 1 and the second optical unit 8 are rested even when the optical apparatus is in the tilted use state. Therefore, as expressed by the following expressions (5) and (6), the ratio of the radii $R_1$ and $R_2$ should be set such that the two moments $T_1$ and $T_2$ are equal to each other. According to such setting of the ratio, the second optical unit 8 becomes a counterweight providing an obliquely upward force to lift the first optical unit 1 in the obliquely upward direction such that the first optical unit 1 is not displaced by the gravity in the obliquely downward direction, and the first optical unit 1 becomes a counterweight providing an obliquely upward force to lift the second optical unit 8 in the obliquely upward direction such that the second optical unit 8 is not displaced by the gravity in the downward tilting direction.

$$m_1 g R_1 \sin\theta = m_2 g R_2 \sin\theta \quad (5)$$

$$\frac{R_1}{R_2} = \frac{m_2}{m_1} \quad (6)$$

When the optical apparatus is tilted reversely to the downward and rightward direction shown in FIG. 1, that is, tilted in a downward and leftward direction, the satisfaction of the condition (6) prevents the first and second optical units 1 and 8 from being moved (displaced) due to the gravity.

FIG. 1 merely shows an example of the number and arrangement of the pulleys, and thus the number and arrangement thereof can be arbitrarily selected. Moreover, although Embodiment 1 has described the case where the ratio of the radii (diameters) of the pulleys 5*a* and 5*b* is equal to that of masses of the first and second optical units 1 and 8 (that is, the case where the condition (6) is satisfied), the satisfaction of the condition (6) is not necessarily required. As long as the ratio of the moments $T_1$ and $T_2$ (the ratio is obtained by dividing a larger moment by a smaller moment) is closer to 1 than the ratio of the masses of the first and second optical units (the ratio is obtained by dividing a heavier mass by a lighter mass), a certain effect can be obtained. That is, the ratio of the radii of the pulleys 5*a* and 5*b* should be set such that the ratio of the moments $T_1$ and $T_2$ becomes closer to 1 than the ratio of the masses (or equal to 1).

In other words, when a value obtained by dividing a larger one of a product of the mass of the first optical unit and a rotational radius of the first rotatable member and a product of the mass of the second optical unit and a rotational radius of the second rotatable member by the other smaller one is defined as a first value, and a value obtained by dividing a heavier one of the masses of the first and second optical units by the other lighter one is defined as a second value, the ratio of the diameters (rotational radii) of the pulleys 5*a* and 5*b* (first and second rotatable members) should be set such that the first value (1 or more) is closer to 1 (smaller) than the second value (1 or more). The first value may be a value obtained by dividing a larger one of a first moment generated in the first rotatable member based on the mass of the first optical unit and a second moment generated in the second rotatable member based on the mass of the second optical unit by the other smaller one.

It is desirable that the ratio of the moments $T_1$ and $T_2$ (or the products of the masses of the optical units and the rotational radii of the rotatable members) be 1 or more and less than 1.10 (more desirably less than 1.05).

Moreover, a mechanism for adjusting the tension of the flexible linking member may be provided, which will be described in Embodiment 5.

Embodiment 2

Figure 2:
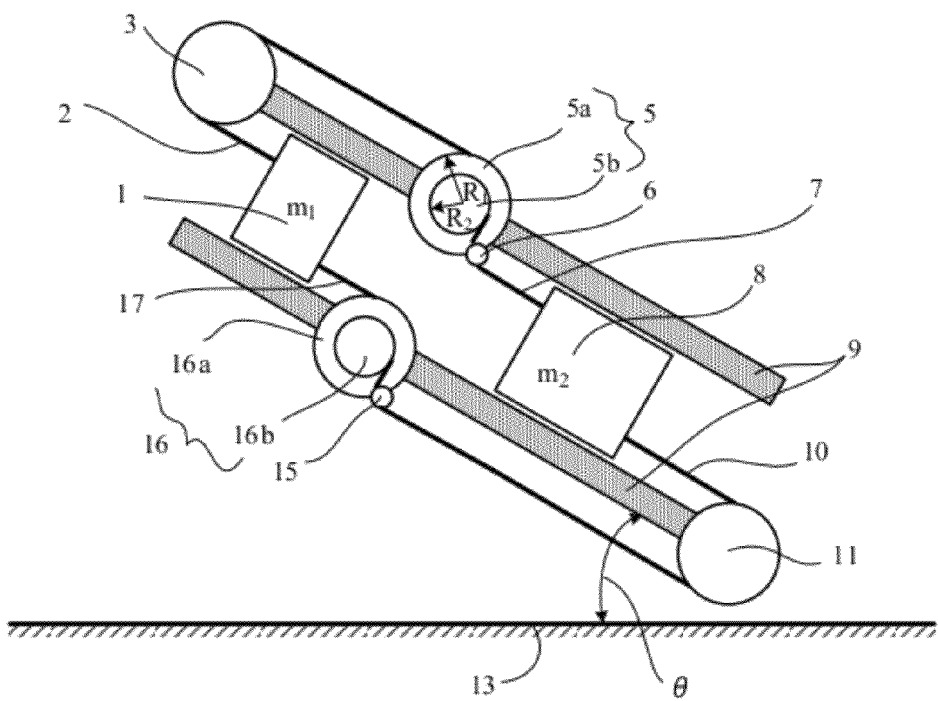
FIG. 2 shows the configuration of an optical apparatus that is Embodiment 2 of the present invention.

FIG. 2 shows the configuration of an optical apparatus that is a second embodiment (Embodiment 2) of the present invention. A first optical unit 1 and a second optical unit 8 are respectively moved by driving forces from actuators (not shown) along a guide 9 attached to a fixed member (not shown) so as to become closer to and further away from each other in an optical axis direction while maintaining a predetermined positional relationship. FIG. 2 shows a tilted use state of the optical apparatus.

A first flexible linking member (first wound linking member) 2 is wound around a pulley 3 rotatably held at a front part of the fixed member and a large diameter pulley 5a of a two-step pulley 5 rotatably held at an optical-axis-direction intermediate part of the fixed member. One end of the first flexible linking member 2 is connected to a front part of the first optical unit 1, and another end of the first flexible linking member 2 is fixed to one circumferential portion of the large diameter pulley 5a. Moreover, a second flexible linking member (second wound linking member) 7 is wound around a small diameter pulley 5b of the two-step pulley 5 and a guide pulley 6 disposed at the vicinity of the two-step pulley 5. One end of the second flexible linking member 7 is fixed to one circumferential portion of the small diameter pulley 5b, and another end of the second flexible linking member 7 is connected to a front part of the second optical unit 8.

In this embodiment, a linking mechanism including the first and second flexible linking members 2 and 7 and the two-step pulley 5 is referred to as a "first linking mechanism".

A third flexible linking member (second wound linking member) 10 is wound around a pulley 11 rotatably held at a rear part of the fixed member and a small diameter pulley 16b of a two-step pulley 16 rotatably held at an optical-axis-direction intermediate part of the fixed member. The third flexible linking member 10 is also wound around a guide pulley 15 disposed at the vicinity of the two-step pulley 16.

One end of the third flexible linking member 10 is fixed to one circumferential portion of the small diameter pulley 16b, and another end of the third flexible linking member 10 is connected to a rear part of the second optical unit 8. In addition, a fourth flexible linking member (first wound linking member) 17 is wound around a large diameter pulley 16a of two-step pulley 16. One end of the fourth flexible linking member 17 is fixed to one circumferential portion of the large diameter pulley 16a, and another end of the fourth flexible linking member 17 is connected to a rear part of the first optical unit 1.

In this embodiment, a linking mechanism including the third and fourth flexible linking members 10 and 17 and the two-step pulley 16 is referred to as a "second linking mechanism".

The large diameter pulley 5a and the small diameter pulley 5b of the two-step pulley 5 respectively correspond to a first rotatable member and a second rotatable member that are rotatable integrally with each other. Moreover, the large diameter pulley 16a and the small diameter pulley 16b of the two-step pulley 16 respectively correspond to a first rotatable member and a second rotatable member that are rotatable integrally with each other.

Thus, the first optical unit 1 and the second optical unit 8 are linked through the first and second linking mechanisms. When the optical apparatus is in a right downward tilted use state as shown in FIG. 2, an obliquely downward force caused by gravity acts on each of the first and second optical units 1 and 8 in a downward and rightward direction (obliquely downward direction). In this state, the first linking mechanism links the first and the second optical units 1 and 8 with each other such that one of the first and second optical units 1 and 8 becomes a counterweight to provide an obliquely upward force acting on the other of the first and second optical units 1 and 8 in an upward and leftward direction (obliquely upward direction).

On the other hand, when the optical apparatus is in a left downward tilted use state, an obliquely downward force caused by the gravity acts on each of the first and second optical units 1 and 8 in the downward and leftward direction (obliquely downward direction). In this state, the second linking mechanism links the first and the second optical units 1 and 8 with each other such that one of the first and second optical units 1 and 8 becomes a counterweight to provide an obliquely upward force acting on the other of the first and second optical units 1 and 8 in the upward and rightward direction (obliquely upward direction).

In the first and second linking mechanisms, appropriate setting of a ratio of radii (or diameters) $R_1$ and $R_2$ of the large and small diameter pulleys 5a and 16a and 5b and 16b in the two-step pulleys 5 and 16 balances component of forces $F_1$ and $F_2$ of own weights of the first and second optical units 1 and 8 acting thereon in the downward tilting direction.

The principle of the counterweight function realized by the first and second linking mechanisms is similar to that described in Embodiment 1.

FIG. 2 merely shows an example of the number and arrangement of the pulleys, and thus the number and arrangement thereof can be arbitrarily selected. Moreover, the first and second mechanisms may be respectively plurally provided. Furthermore, a mechanism for adjusting a tension of each flexible linking member may be provided.

Embodiment 3

Figure 3:
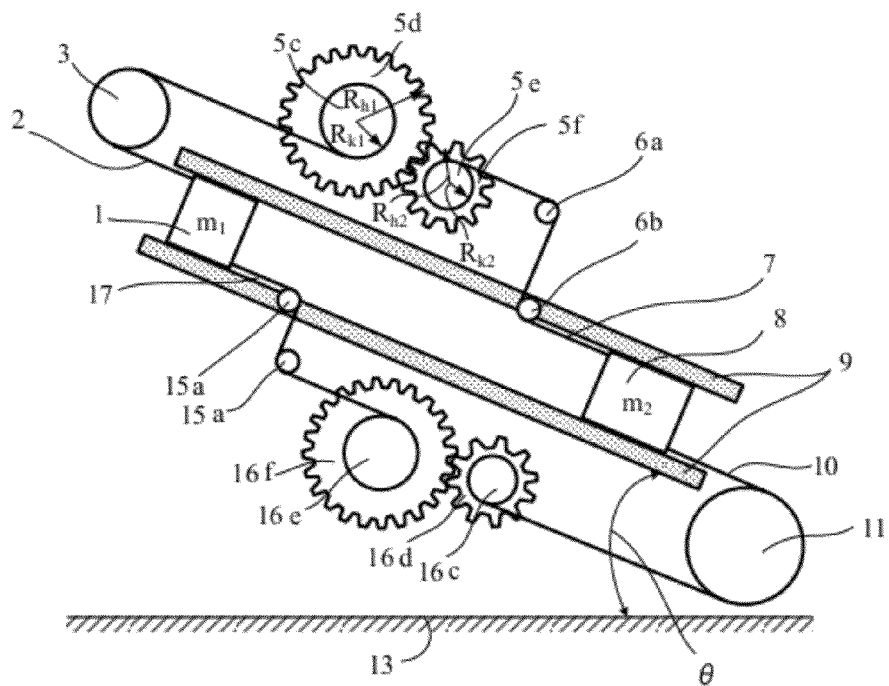
FIG. 3 shows the configuration of an optical apparatus that is Embodiment 3 of the present invention.

FIG. 3 shows the configuration of an optical apparatus that is a third embodiment (Embodiment 3) of the present invention. This embodiment uses a gear with a pulley, instead of the two-step pulley shown in Embodiments 1 and 2.

A first optical unit 1 and a second optical unit 8 are respectively moved by driving forces from actuators (not shown) along a guide 9 attached to a fixed member (not shown) so as to become closer to and further away from each other in an optical axis direction while maintaining a predetermined positional relationship. FIG. 3 shows a tilted use state of the optical apparatus.

A large diameter pulley 5c and a large diameter gear 5d rotate integrally with each other. Moreover, a small diameter pulley 5e and a small diameter gear 5f rotate integrally with each other. The large diameter gear 5d and the small diameter gear 5f engage with each other. The large diameter pulley 5c and the small diameter pulley 5e respectively correspond to a first rotatable member and a second rotatable gear that rotate in conjunction with each other through the large diameter gear 5d and the small diameter gear 5f.

A first flexible linking member (first wound linking member) 2 is wound around a pulley 3 rotatably held at a front part of the fixed member and the large diameter pulley 5c rotatably held at an optical-axis-direction intermediate part of the fixed member. One end of the first flexible linking member 2 is connected to a front part of the first optical unit 1, and another end of the first flexible linking member 2 is fixed to one circumferential portion of the large diameter pulley 5c. Moreover, a second flexible linking member (second wound linking member) 7 is wound around the small diameter pulley 5e and guide pulleys 6a and 6b. One end of the second flexible linking member 7 is fixed to one circumferential portion of the small diameter pulley 5e, and another end of the second flexible linking member 7 is connected to a front part of the second optical unit 8.

In this embodiment, a linking mechanism including the gears 5d and 5f, the first and second flexible linking members 2 and 7 and the pulleys 5e and 5f is referred to as a "first linking mechanism".

A small diameter pulley 16c and a small diameter gear 16d rotate integrally with each other. Moreover, a large diameter pulley 16e and a large diameter gear 16f rotate integrally with each other. The small diameter gear 16d and the large diameter gear 16f engage with each other. The large diameter pulley 16e and the small diameter pulley 16c respectively correspond to a first rotatable member and a second rotatable gear that rotate in conjunction with each other through the small diameter gear 16d and the large diameter gear 16f.

A third flexible linking member (second wound linking member) 10 is wound around a pulley 11 rotatably held at a rear part of the fixed member and the small diameter pulley 16c rotatably held at an optical-axis-direction intermediate part of the fixed member. One end of the third flexible linking member 10 is connected to a rear part of the second optical unit 8, and another end of the third flexible linking member 10 is fixed to one circumferential portion of the small diameter pulley 16c. In addition, a fourth flexible linking member (first wound linking member) 17 is wound around the large diameter pulley 16e and guide pulleys 15a and 15b. One end of the fourth flexible linking member 17 is fixed to one circumferential portion of the large diameter pulley 16e, and another end of the fourth flexible linking member 17 is connected to a rear part of the first optical unit 1.

In this embodiment, a linking mechanism including the gears 16d and 16f, the third and fourth flexible linking members 10 and 17 and the pulleys 16c and 16e is referred to as a "second linking mechanism".

Next, description will be made of the principle of a counterweight function realized by the above-described first and second linking mechanisms. In a state where the optical apparatus is tilted by an angle θ as shown in FIG. 3, the following moments respectively act on the large diameter pulley 5c and the small diameter pulley 5e of the first linking mechanism:

$$T_1 = m_1 g R_{k1} \sin\theta \quad (7)$$

$$T_2 = m_2 g R_{k2} \sin\theta \quad (8)$$

where $R_{k1}$ and $R_{k2}$ respectively represent radii of the large and small diameter pulleys 5c and 5e.

If the two moments balance each other through the large diameter gear 5d and the small diameter gear 5f, the first optical unit 1 and the second optical unit 8 are rested. Forces acting at a point where the large diameter gear 5d and the small diameter gear 5f have a same magnitude and opposite directions, so that the following relationship is established when focusing only on the magnitude of the forces:

$$\frac{T_1}{R_{h1}} = \frac{T_2}{R_{h2}} \quad (9)$$

$$\frac{m_1 g R_{k1} \sin\theta}{R_{h1}} = \frac{m_2 g R_{k2} \sin\theta}{R_{h2}} \quad (10)$$

$$\frac{R_{k2}}{R_{k1}} \frac{R_{h1}}{R_{h2}} = \frac{m_1}{m_2} \quad (11)$$

where $R_{h1}$ and $R_{h2}$ respectively represent radii of pitch circles of the large and small diameter gears 5d and 5f.

Setting the radius of each pulley and the radius of the pitch circle of each gear so as to satisfy the condition (11) always balances the two moments. This also applies to the second linking mechanism.

Embodiment 4

Figure 4:
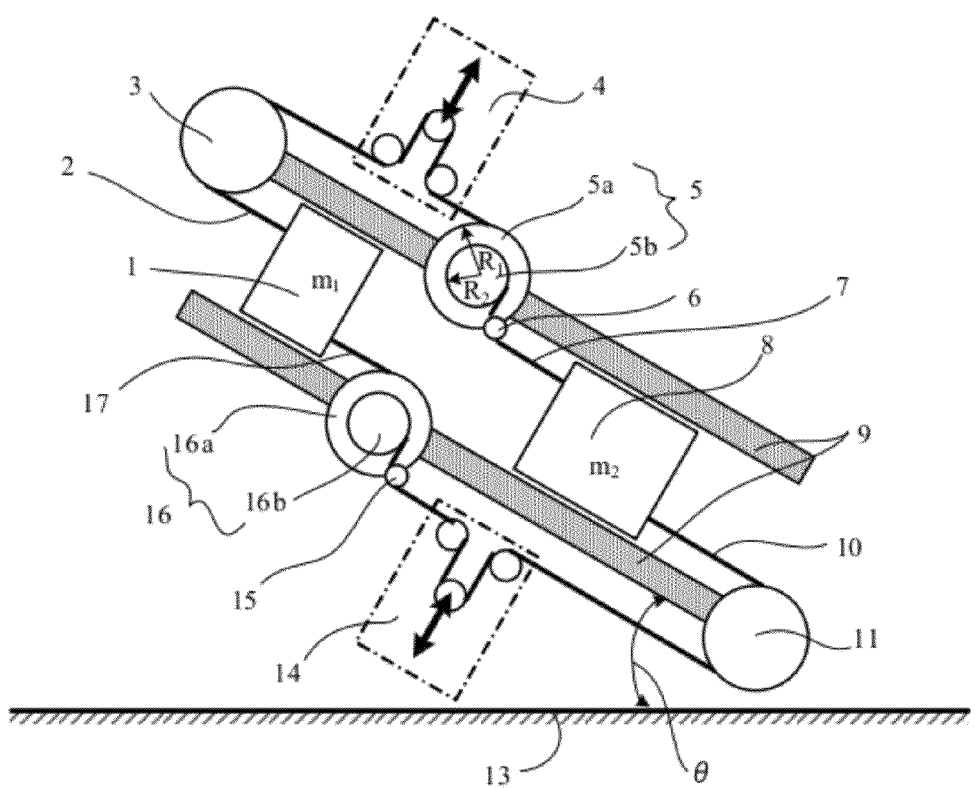
FIG. 4 shows the configuration of an optical apparatus that is Embodiment 4 of the present invention.

FIG. 4 shows the configuration of an optical apparatus that is a fourth embodiment (Embodiment 4) of the present invention. This embodiment adds, to the first and second linking mechanisms in the optical apparatus shown in FIG. 2, length adjustment mechanisms 4 and 14 for adjusting lengths of the flexible linking members to change a relationship of relative position of the first optical unit 1 and the second optical unit 8. The length adjustment mechanism 4 included in the first linking mechanism changes the length of the first flexible linking member 2 in the optical axis direction from the large diameter pulley 5a to the first optical unit 1. The length of the first flexible linking member 2 in the optical axis direction means a length of the first flexible linking member 2 projected toward the optical axis. Moreover, the length adjustment mechanism 14 included in the second linking mechanism changes the length of the third flexible linking member 10 in the optical axis direction from the small diameter pulley 16b to the second optical unit 8. The length of the second flexible linking member 10 in the optical axis direction also means a length of the third flexible linking member 10 projected toward the optical axis. The length in the optical axis direction is hereinafter referred to as an "optical-axis-direction length".

Next, description will be made of a reason why it is necessary to provide the length adjustment mechanism. In a case where the first optical unit 1 and the second optical unit 8 are moved while maintaining a ratio of a movement velocity $V_1$ of the first optical unit 1 and a movement velocity $V_2$ of the second optical unit 8, that is, $$\frac{V_1}{V_2} = N \quad (12)$$

at a constant value, a movement distance $Y_1$ of the first optical unit 1 and a movement distance $Y_2$ of the second optical unit 8 for a period of time t is expressed as follows:

$$Y_1 = V_1 t = R_1 \omega t \quad (13)$$

$$Y_2 = V_2 t = R_2 \omega t \quad (14)$$

where ω represents an angular velocity of the two-step pulley (5 or 16).

A ratio of the movement distances $Y_1$ and $Y_2$ of the first and second optical units 1 and 8 is expressed as follows:

$$\frac{Y_1}{Y_2} = \frac{V_1}{V_2} = \frac{R_1}{R_2} = N. \quad (15)$$

That is, setting of the radius ratio $R_1/R_2$ of the two-step pulleys to be equal to the movement velocity ratio N causes the first and second optical units 1 and 8 to be moved while maintaining a constant velocity ratio. In other words, the movement velocity ratio N of the first and second optical units 1 and 8 is decided depending on the radius ratio $R_1/R_2$ of the two-step pulley.

However, the counterweight function requires establishment of the relationship of the expression (6) described in Embodiment 1. Therefore, when a sufficient freedom degree of design is provided for the mass $m_1$ of the first optical unit 1 and the mass $m_2$ of the second optical unit 8, it is necessary that the radius ratio of the two-step pulley and the mass ratio of the first and second optical units 1 and 8 satisfy the following condition:

$$\frac{R_1}{R_2} = \frac{m_2}{m_1} = N. \qquad (16)$$

In a case of not maintaining the ratio of the movement velocities $V_1$ and $V_2$ at a constant value, it is necessary to make the optical-axis-direction length of at least one of the first and second flexible linking members 2 and 7 and the optical-axis-direction length of at least one of the third and fourth flexible linking members 10 and 17 variable. That is, in a case where the first and second optical units 1 and 8 become away from each other while maintaining a relationship of relative position according to a certain function other than that shown by the expression (15), the optical-axis-direction length of the flexible linking member includes a surplus length, and therefore it is necessary to absorb the surplus length in a direction different from the optical axis direction. Similarly, in a case where the first and second optical units 1 and 8 become closer to each other, the optical-axis-direction length of the flexible linking member becomes deficient, and therefore it is necessary to release a part of the flexible linking member absorbed in the direction different from the optical axis direction. Thus, this embodiment is provided with the length adjustment mechanisms 4 and 14 that are necessary for such cases.

Although this embodiment describes the case where the length adjustment mechanisms 4 and 14 respectively adjust the lengths of the first and third flexible linking members 2 and 10, the length adjustment mechanisms 4 and 14 may respectively adjust the lengths of the second and fourth flexible linking members 7 and 17. The flexible linking member for which the length adjustment mechanism is provided may be selected depending on ease of layout of the length adjustment mechanisms inside the optical apparatus. Configuration parameters of the length adjustment mechanism may be changed according to the selected flexible linking member.

FIG. 5A to 5F show a first example of the length adjustment mechanism. This length adjustment mechanism adjusts the lengths of the first and third flexible linking members 2 and 10 such that the positional relationship of the first and second optical units 1 and 8 is nonlinearly changed in their movable range as shown in FIG. 5F. Specifically, the length adjustment mechanism nonlinearly changes the positional relationship of the first and second optical units 1 and 8 by a combination of a linear part and a nonlinear part.

As shown in FIG. 5A, the length adjustment mechanism includes pulleys 20, 26 and 30, pinions 21, 25 and 29, a rack 32 movable in a direction orthogonal to the optical axis direction and a noncircular pulley 23 attached to the rack 32. The first flexible linking member 2 is wound around, in order from the first optical unit side, the pulley 20, the noncircular pulley 23, the pulley 26, the pulley 30 and the large diameter pulley 5a shown in FIG. 4 and then fixed to the large diameter pulley 5a. FIG. 5E shows an example of how to wind the first flexible linking member 2.

As shown in FIG. 5B, the pulley 20 and the pinion 21 are concentrically arranged, and a one-way clutch 22 is provided between the pulley 20 and the pinion 21. The one-way clutch 22 rotates the pulley 20 and the pinion 21 integrally with each other when the first flexible linking member 2 is moved in a direction shown by an arrow (hereinafter referred to as an "arrow direction") in FIG. 5A, and allows the pulley 20 and the pinion 21 to rotate separately from each other when the first flexible linking member 2 is moved in an opposite direction to the arrow direction.

The pinion 21 engages with the rack 32, and the noncircular pulley 23 is attached to an upper end of the rack 32 via a shaft 24. The rack 32 further engages with the pinion 25, and the pinion 25 and the pulley 26 is arranged on a same shaft 27. Moreover, as shown in FIG. 5C, a lock mechanism 28 is provided on the shaft 27. The lock mechanism 28 stops rotation (that is, prevents free rotation) of the pinion 25 and the pulley 26 when the first optical unit 1 is rested.

The pinion 25 also engages with the pinion 29, and the pinion 29 and the pulley 30 are concentrically arranged. A one-way clutch 31 is provided between the pinion 29 and the pulley 30. The one-way clutch 31 allows the pinion 29 and the pulley 30 to rotate separately from each other when the first flexible linking member 2 is moved in the arrow direction in FIG. 5A, and rotates the pinion 29 and the pulley 30 integrally with each other when the first flexible linking member 2 is moved in the opposite direction to the arrow direction.

Next, description will be made of the principle of operation of the length adjustment mechanism. The first optical unit 1 and the second optical unit 8 in FIG. 4 are respectively moved by the actuators (not shown).

When the first flexible linking member 2 is moved in the arrow direction in FIG. 5A with the movement of the first optical unit 1, the pulley 20 and the pinion 21 are rotated integrally with each other in a clockwise direction, and thereby the rack 32 is moved downward. With this motion, the pinion 25, the pulley 26, the pinion 29 and the pulley 30 are also rotated together therewith, the pulleys 26 and 30 and the pinions 25 and 29 being separately rotated.

If the first flexible linking member 2 is moved by $Y_1$ on a further left side than the pulley 20 with the downward movement of the rack 32 and the noncircular pulley 23 by X, the second flexible linking member 2 is moved by $Y_2$ ($<Y_1$) on a further right side than the pulley 30. In the positional relationship of the first and second optical units 1 and 8, the linear part (linearly changing part) is adjusted by the movement of the rack 32, and the nonlinear part (nonlinearly changing part) is adjusted by a shape of the noncircular pulley 23. An adjustment amount of the linear part in the positional relationship of the first and second optical units 1 and 8 by the rack 32 can be calculated by replacing the noncircular pulley 23 by a circular pulley.

When a movement amount corresponding to the linear part on the further right side than the pulley 30 with the movement of the first flexible linking member 2 on the further left side than the pulley 20 by $Y_1$ is defined as $Y_3$, the following relationships are established:

$$Y_1 = R_3\theta_1,\ \theta_1 = \frac{Y_1}{R_3} \qquad (17)$$

$$X = R_4\theta_1 = \frac{R_4}{R_3}Y_1 \qquad (18)$$

$$Y_3 = Y_1 - 2X = Y_1 - 2\frac{R_4}{R_3}Y_1 = \left(\frac{R_3 - 2R_4}{R_3}\right)Y_1 \qquad (19)$$

$$\frac{Y_1}{Y_3} = \frac{R_3}{R_3 - 2R_4} \qquad (20)$$

where $R_3$ represents a radius of the pulley 20, $\theta_1$ represents a rotation angle of the pulley 20, and $R_4$ represents a radius of the pinion 21. Thus, the linear part of the positional relationship of the first and second optical units 1 and 8 is decided depending on the radii of the pulley 20 and pinion 21.

A nonlinear part $Y_4$ of the positional relationship of the first and second optical units 1 and 8 on the further right side than the pulley 30 is adjusted by the shape of the noncircular pulley 23, and the following necessary positional relationship is finally maintained:

$$Y_2 = Y_3 + Y_4.$$

In addition, in the length adjustment mechanism, the first flexible linking member 2 is wound around a guide pulley 70, the large diameter pulley 5a of the two-step pulley 5 shown in FIG. 4 and fixed thereto, so that the movement amount of the second optical unit 8 is expressed as follows:

$$(R_2/R_1)Y_2.$$

In other words, when the first optical unit 1 is moved by $Y_1$, the second optical unit 8 is moved by the movement amount $(R_2/R_1)Y_2$.

When the first and second optical units 1 and 8 are rested, the lock mechanism 28 provided for the pinion 25 and the pulley 26 operates to prevent the rotation of the pinion 25 and the pulley 26. In this state, since the moments acting on the two-step pulley 5 balance each other as described in FIG. 3, supply of electric power to the actuators for driving the first and second optical units 1 and 8 is unnecessary.

Moreover, when the second flexible linking member 2 is moved in the opposite direction to the arrow direction depending on the movement direction of the second optical unit 8, the pulley 30 and the pinion 29 are rotated integrally with each other in a counterclockwise direction, and the pulley 26 and the pinion 25 are rotated independently of each other in the clockwise direction. In addition, the pulley 20 and the pinion 21 are rotated independently of each other in the counterclockwise direction. With these rotations, the rack 32 is moved upward, and the noncircular pulley 23 attached to the upper end of the rack 32 is also moved upward while rotating in the clockwise direction. Thus, the positional relationship of the first and second optical units 1 and 8 is maintained.

When a movement amount corresponding to the linear part on the further left side than the pulley 20 for a movement of the first flexible linking member 2 in the opposite direction to the arrow direction in FIG. 5A by $Y_2$ on the further right side than the pulley 30 is defined as $Y_5$, the following relationships are established:

$$Y_2 = R_5 \theta_2, \ \theta_2 = \frac{Y_2}{R_5} \quad (21)$$

$$X = R_6 \theta_2 = \frac{R_6}{R_5} Y_2 \quad (22)$$

$$Y_5 = Y_2 + 2X = Y_2 + 2\frac{R_6}{R_5}Y_2 = \left(\frac{R_5 + 2R_6}{R_5}\right) Y_2 \quad (23)$$

$$\frac{Y_5}{Y_2} = \frac{R_5 + 2R_6}{R_5} \quad (24)$$

where $R_5$ represents a radius of the pulley 30, $R_6$ represents a radius of the pinion 29, and $\theta_2$ represents a rotation angle of the pulley 30 and the pinion 29. Although the radii (teeth numbers) of the pinions 29 and 25 herein are equal to each other to simplify the calculation, the radii may be different from each other.

When considering a movement amount $Y_6$ obtained as an effect of the noncircular pulley 23, the movement amount of the first flexible linking member 2 on the further left side than the pulley 20 is expressed as follows:

$$Y_1 = Y_5 + Y_6,$$

and a necessary positional relationship of the first and second optical units 1 and 8 is maintained.

Moreover, when considering an effect of the two-step pulley shown in FIG. 4, the first and second optical units 1 and 8 have the following relationship:

$$Y_1 = (Y_5 + Y_6)(R_2/R_1).$$

In the case where the first flexible linking member 2 is moved in the arrow direction in FIG. 5A in one length adjustment mechanism, the length adjustment mechanism is designed such that the linear part of the positional relationship of the first and second optical units 1 and 8 satisfies the condition (20), and the radius $R_3$ of the pulley 20 and the radius $R_4$ of the pinion 21 satisfy a necessary relationship of the linear part. Moreover, in the case where the first flexible linking member 2 is moved in the opposite direction to the arrow direction in FIG. 5A, the length adjustment mechanism is designed such that the linear part of the positional relationship of the first and second optical units 1 and 8 satisfies the condition (24), and the radius $R_5$ of the pulley 30 and the radius $R_6$ of the pinion 29 satisfy a necessary relationship of the linear part.

However, in one length adjustment mechanism, characteristics in the linear part of the necessary positional relationship often do not change even when the movement direction of the flexible linking member is changed. That is, in most cases, the positional relationship of the first and second optical units 1 and 8 is identical regardless of the movement direction of the flexible linking member. In such cases, the conditions (20) and (24) showing the relationship of the linear part have the following inverse relationship:

$$\frac{R_3}{R_3 - 2R_4} = \frac{R_5 + 2R_6}{R_5}. \quad (25)$$

In other words, it is necessary to design the radii of the pulleys and pinions so as to satisfy the condition (25). In actual design, some countermeasure for reduction of backlash of the rack 32 in the vertical direction should be made such as providing a linear guide or providing guide pinions on both sides of the rack 32.

Figure 6A:
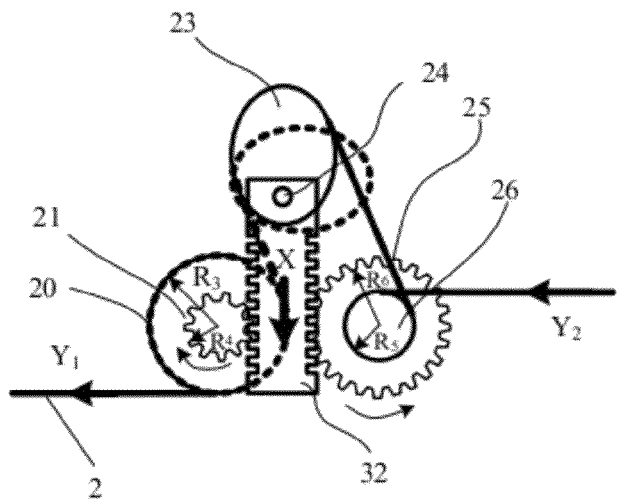
FIGS. 6A to 6C show a second example of the configuration of a length adjustment mechanism of the optical apparatus of Embodiment 4.
Figure 6B:
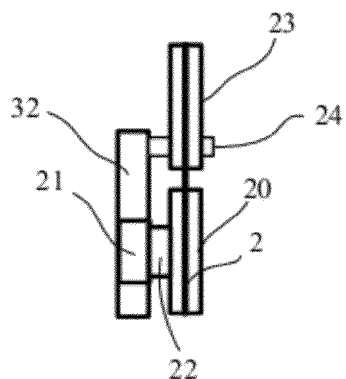
Figure 6C:
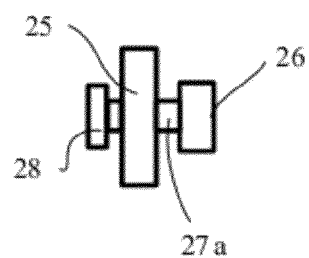

FIGS. 6A to 6C show a second example of the length adjustment mechanism. This length adjustment mechanism is different from the first example in that it employs how to wind the flexible linking member shown in FIG. 6A to eliminate the pinion 29, the pulley 30 and the one-way clutch 31 and provides a lock mechanism 28 and a one-way clutch 27a for the pinion 25 and the pulley 26. In other words, providing the function realized by the two pinions and the two pulleys in the first example to one pinion and one pulley reduces component counts and a placement space.

Figure 7A:
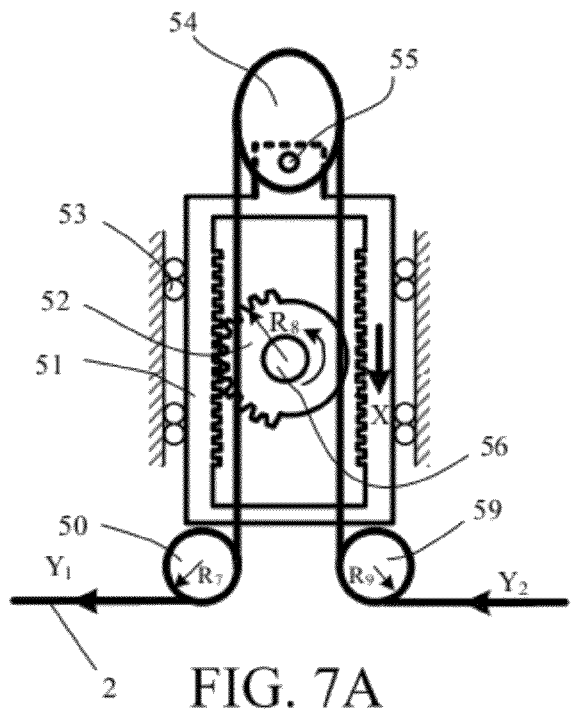
FIGS. 7A to 7C show a third example of the configuration of a length adjustment mechanism of the optical apparatus of Embodiment 4.
Figure 7B:
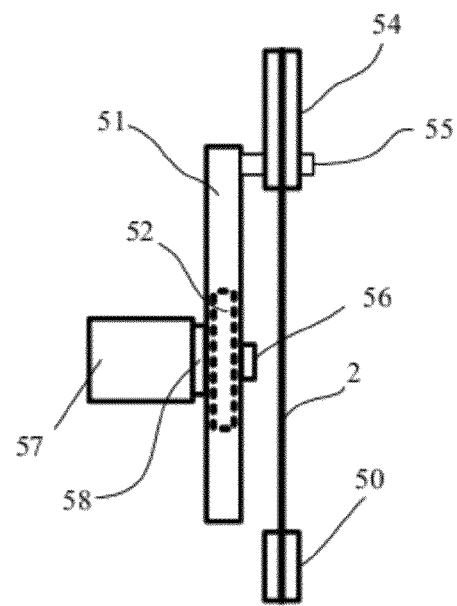
Figure 7C:
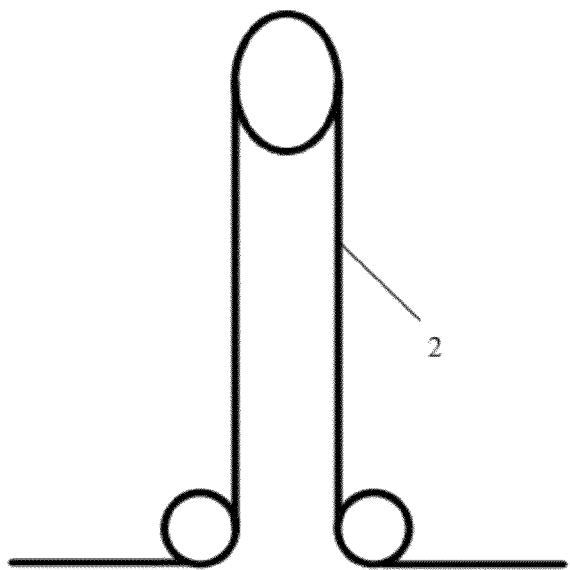

FIGS. 7A to 7C show a third example of the length adjustment mechanism. This length adjustment mechanism has a same basic configuration as that of each of the first and second examples which adjusts the positional relationship of the first and second optical units 1 and 8 by the combination of the linear part and the nonlinear part. This length adjustment mechanism includes pulleys 50 and 59, a double sided rack 51, a partial teeth pinion 52 and a rack guide 53.

The first flexible linking member 2 is wound around the pulley 50, a noncircular pulley 54 rotatably attached to a shaft held at an upper part of the double sided rack 51, the pulley 59 and the large diameter pulley 5a shown in FIG. 4 and fixed to the large diameter pulley 5a. FIG. 7C shows how to wind the first flexible linking member 2.

The double sided rack 51 is movable while being guided in the vertical direction by the rack guide 53, and engages with the partial teeth pinion 52 disposed inside the double sided rack 51. The partial teeth pinion 52 is attached to a motor shaft 56 that is an output shaft of a motor 57 as shown in FIG. 7B through a lock mechanism 58 that prevents rotation of the partial teeth pinion 52 when the motor 57 is stopped.

When the first and second optical units 1 and 8 are moved by the actuators, the first flexible linking member 2 is moved in a direction of an arrow (hereinafter referred to as an "arrow direction") shown in FIG. 7A or in an opposite direction thereto. When the first flexible linking member 2 is moved in the arrow direction, the motor 57 is rotated in a counterclockwise direction with the movement of the first and second optical units 1 and 8, and the partial teeth pinion 52 engages with a left rack of the double sided rack 51 to move the double sided rack 51 downward. With this movement, the noncircular pulley 54 is moved downward together with the double sided rack 51 while being rotated in the counterclockwise direction. Such motion maintains a relationship of relative position of the first and second optical units 1 and 8.

When the first flexible linking member 2 is moved in the opposite direction to the arrow direction, the partial teeth pinion 52 engages with a right rack of the double sided rack 51 to move the double sided rack 51 upward. With this movement, the noncircular pulley 54 is moved upward together with the double sided rack 51 while being rotated in the clockwise direction. Such motion maintains the relationship of relative position of the first and second optical units 1 and 8.

When the first and second optical units 1 and 8 are rested, the lock mechanism 58 operates to prevent the rotation of the partial teeth pinion 52. In this state, the moments acting on the two-step pulley 5 shown in FIG. 4 balance each other, and thereby the first and second optical units 1 and 8 are maintained in a rested state.

Loads acting on the motor 57 mainly include a resistance force of the rack guide 53, a resistance force due to engagement of the double sided rack 51 and the partial teeth pinion 52, and masses of the double sided racks 51 and the noncircular pulley 54. Accordingly, the load of the motor 57 is light, and therefore electric power consumption of the motor 57 is reduced.

Figure 8A:
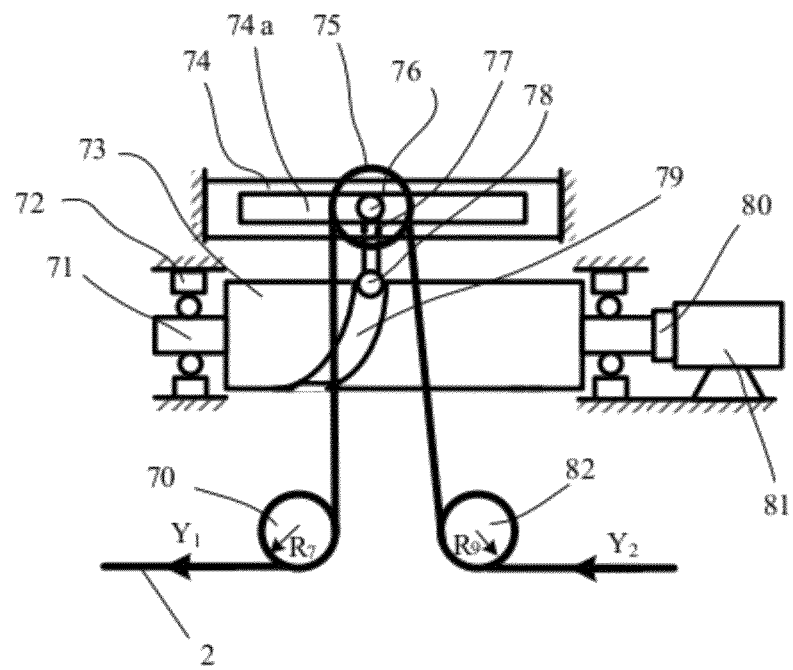
FIGS. 8A and 8B show a fourth example of the configuration of a length adjustment mechanism of the optical apparatus of Embodiment 4.
Figure 8B:
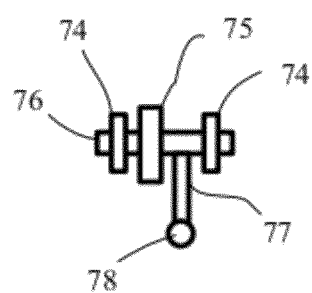

FIGS. 8A and 8B show a fourth example of the length adjustment mechanism. This length adjustment mechanism changes a position of a length adjusting pulley 75 provided for adjusting the optical-axis-direction length of the first flexible linking member 2 according to the positional relationship of the first and second optical units 1 and 8. FIG. 8 shows a configuration example for changing the position of the length adjusting pulley 75, which includes a cylindrical cam and a motor.

The first flexible linking member 2 is wound around a guide pulley 70, the length adjusting pulley 75, a guide pulley 82 and the large diameter pulley 5a shown in FIG. 4 and fixed thereto. The length adjusting pulley 75 is rotatably attached to a shaft 76 held at an upper part of a connecting member 77. A follower 78 that is movable along a cam groove portion 79 formed on a cylindrical cam 73 is attached to a lower end of the connecting member 77. The shaft 76 for the length adjusting pulley 75 is movable along a guide groove portion 74a formed on a guide member 74 so as to extend in the optical axis direction. The cylindrical cam 73 has a cam cylinder shaft 71, and ends of the cam cylinder shaft 71 are rotatably supported by bearings 72. Moreover, one end of the cam cylinder shaft 71 is coupled to an output shaft of a motor 81 through a lock mechanism 80.

When the first and second optical units 1 and 8 shown in FIG. 4 are moved by the actuators, the first flexible linking member 2 is moved in a direction of an arrow (hereinafter referred to as an "arrow direction") shown in FIG. 8A or in an opposite direction thereto. When the first flexible linking member 2 is moved in the arrow direction, the guide pulley 70 is rotated in a clockwise direction, the length adjusting pulley 75 is rotated in a counterclockwise direction and the guiding pulley 82 is rotated in the clockwise direction. The motor 81 rotates, simultaneously thereto, in response to a rotation instruction from a controller (not shown), to drive the cylindrical cam 73. This causes the follower 78 to be moved along the cam groove portion 79, and thereby the shaft 76 for the length adjusting pulley 75 connected to the follower 78 via the connecting member 77 is moved along the guide groove portion 74a. This motion causes the length adjusting pulley 75 to be moved in the optical axis direction.

The cam groove portion 79 is designed according to the positional relationship of the first and second optical units 1 and 8, and moves the follower 78 therealong to move the length adjusting pulley 75. The movement of the length adjusting pulley adjusts the optical-axis-direction length of the first flexible linking member 2. Thus, the positional relationship of the first and second optical units 1 and 8 is maintained.

In a state where the first and second optical units 1 and 8 are rested, the lock mechanism 80 operates to prevent rotation of the cylindrical cam 73.

Moreover, when the first flexible linking member 2 is moved in the opposite direction to the arrow direction, the motor 81 should be rotated in a direction reverse to that in the above case.

Although the above description has been made of five configuration examples of the length adjustment mechanism, the configuration of the length adjustment mechanism that adjusts (changes) the optical-axis-direction length of at least one of the flexible linking members is not limited thereto. That is, other length adjustment mechanisms may be used which include a link mechanism or a crank mechanism.

Embodiment 5

Figure 9:
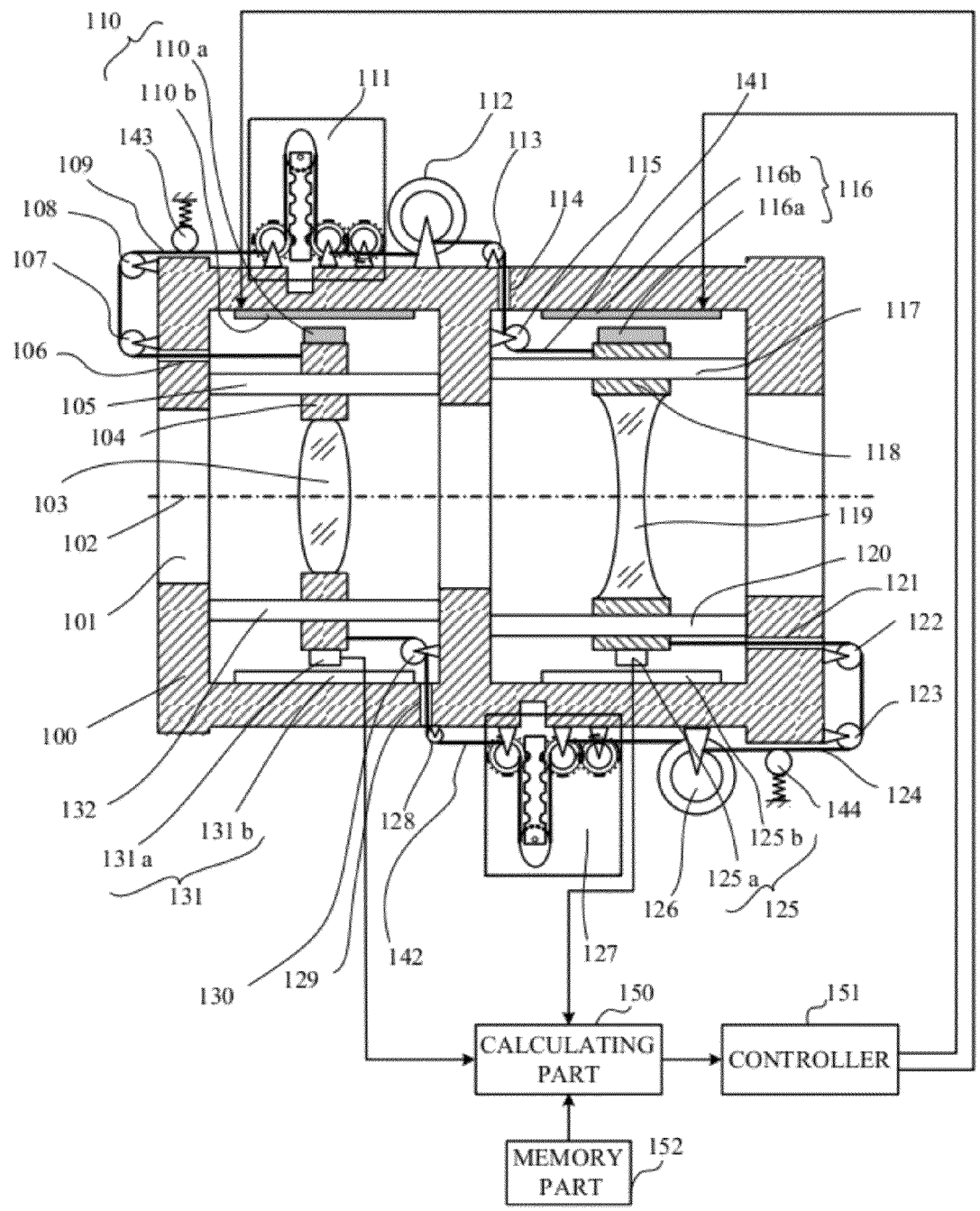
FIG. 9 shows the configuration of an optical apparatus that is Embodiment 5 of the present invention.

FIG. 9 shows the configuration of a lens apparatus as an optical apparatus that is a fifth embodiment of the present invention. A variator lens 103 as a first optical unit is held by a holding member 104. The holding member 104 is movable along guides 105 and 132 in an optical axis direction in which an optical axis 102 extends. The variator lens 103 is moved in the optical axis direction to perform variation of magnification. The guides 105 and 132 are fixed to a fixed barrel 100 that is a fixed member.

A compensator lens 119 as a second optical unit is held by a holding member 118. The holding member 118 is movable along guides 117 and 120 in the optical axis direction. The compensator lens 119 is moved in the optical axis direction to reduce image plane variation caused due to the variation of magnification. The guides 117 and 120 are fixed to fixed barrel 100.

At plural places on an outer circumferential part of the holding member 104 for the variator lens 103, plural magnets 110a are attached at regular intervals in a circumferential direction. At plural positions corresponding to the plural magnets 110a on an inner wall of the fixed barrel 100, plural coils 110b are attached with predetermined gaps with the magnets 110a. The plural magnets 110a and the plural coils 110b constitute a linear motor 110 that is a first actuator.

At a place on the outer circumferential part of the holding member 104 where the magnets 110a are not attached, a head 131a of a linear encoder 131 that is a first position detector is attached. At a position corresponding to the head 131a on the inner wall of the fixed barrel 100, a scale 131b of the linear encoder 131 is attached with a predetermined gap with the head 131a.

Similarly, at plural places on an outer circumferential part of the holding member 118 for the compensator lens 119, plural magnets 116a are attached at regular intervals in a circumferential direction. At plural positions corresponding to the plural magnets 116a on the inner wall of the fixed barrel 100, plural coils 116b are attached with predetermined gaps with the magnets 116a. The plural magnets 116a and the plural coils 116b constitute a linear motor 116 that is a second actuator.

At a place on the outer circumferential part of the holding member 118 where the magnets 116a are not attached, a head 125a of a linear encoder 125 that is a second position detector is attached. At a position corresponding to the head 125a on the inner wall of the fixed barrel 100, a scale 125b of the linear encoder 125 is attached with a predetermined gap with the head 125a.

At a front end face of the holding member 104 for the variator lens 103, one end of a wire 109 as a first flexible linking member (first wound linking member) is fixed. The wire 109 passes through a hole portion 106 formed in the fixed barrel 100, and is wound around guiding pulleys 107 and 108, a length adjustment mechanism 111 and a large diameter pulley of a two-step pulley 112. Another end of the wire 109 is fixed to one circumferential portion of the large diameter pulley.

A wire 141 as a second flexible linking member (second wound linking member) is wound around a small diameter pulley of the two-step pulley 112, and one end of the wire 141 is fixed to one circumferential portion of the small diameter pulley. The wire 141 is bent by the guide pulley 113, passes through a hole portion 114 formed in the fixed barrel 100 and is wound around a guide pulley 115 to extend to the holding member 118 for the compensator lens 119.

Another end of the wire 141 is fixed at a front end face of the holding member 118. Thus, a mechanism corresponding to the first linking mechanism described in Embodiment 2 is configured. In addition, for the wire 109, a tension adjustment mechanism 143 to adjust a tension of the wire 109 is provided.

At a rear end face of the holding member 118 for the compensator lens 119, one end of the wire 124 is fixed. The wire 124 passes through a hole portion 121 formed in the fixed barrel 100, is wound around guide pulleys 122 and 123 and a small diameter pulley of a two-step pulley 126. Another end of the wire 124 is fixed at one circumferential portion of the small diameter pulley. At one circumferential portion of a large diameter pulley of the two-step pulley 126, one end of a wire 142 wound around the large diameter pulley is fixed.

The wire 142 extends through a length adjustment mechanism 127, is bent by a guide pulley 128, passes through a hole portion 129 formed in the fixed barrel 100 and is wound around a guide pulley 130 to extend to the holding member 104 for the variator lens 103. Another end of the wire 142 is fixed to a rear end face of the holding member 104. Thus, a mechanism corresponding to the second linking mechanism described in Embodiment 2 is configured. In addition, for the wire 124, a tension adjustment mechanism 144 to adjust a tension of the wire 124 is provided.

To the linear motors 110 and 116, the linear encoders 131 and 125 and the lock mechanisms in the length adjustment mechanisms 111 and 127, electric power from a power supply (not shown) is supplied. Position information (detection result) from the linear encoders 131 and 125 is sent to a calculating part 150. The calculating part 150 calculates a positional relationship of the variator lens 103 and the compensator lens 119 from the position information.

Moreover, the calculating part 150 compares the calculated positional relationship with relationship of relative position data of the variator lens 103 and the compensator lens 119 stored in a memory part 152, and sends data showing a positional difference therebetween (positional difference data) to a controller 151. The relationship of relative position data is data showing a target positional relationship that should be satisfied by the positions of the variator lens 103 and compensator lens 119.

The controller 151 drives, if the positional difference is larger than a predetermined value (allowable value), the linear motor 110 or 116 to move the lens 103 or 119 so as to make the positional difference closer to 0, that is, to make the positions of the lenses 103 and 119 closer to the target positional relationship.

The linear motor that is driven to correct the positional difference depends on a control method. In other words, when a method is used which moves the compensator lens 119 so as to follow the variator lens 103 based on the position of the variator lens 103, the linear motor 116 that moves the compensator lens 119 is driven. Conversely, when a method is used which moves the variator lens 103 so as to follow the compensator lens 119 based on the position of the compensator lens 119, the linear motor 110 that moves the variator lens 103 is driven.

During the movement of the variator lens 103 and compensator lens 119 in the optical axis direction, the length adjustment mechanisms 111 and 127 respectively adjust the optical-axis-direction length of the wires 109 and 142, and thereby each wire is in a state where a certain tension is acting thereon. Therefore, the variator lens 103 and the compensator lens 119 always have a predetermined positional relationship.

Actually, there are manufacturing errors of components that constitute the length adjustment mechanisms 111 and 127 and assembly errors thereof. These errors loosen the wires 109 and 142 or excessively shorten the wires 109 and 142 to excessively increase the tension thereof, depending on movement position and direction of the variator lens 103 and compensator lens 119. Thus, this embodiment provides the tension adjustment mechanisms 143 and 144 as a countermeasure to solve such a problem.

For example, when the wires 109 and 142 are loosened, the tension adjustment mechanisms 143 and 144 push the wires 109 and 142 by a reaction force of a spring to remove the looseness. On the other hand, when the wires 109 and 142 are too short, the linear motors 110 and 116 are driven so as to move the variator lens 103 and compensator lens 119 toward positions where a predetermined positional relationship thereof is established, so that the tensions of the wires 109 and 142 are increased. The wires 109 and 142 whose tensions are increased straightly extend and respectively push the springs of the tension adjustment mechanisms 143 and 144 back, and thereby the lengths of the wires 109 and 142 are fine-tuned. Thus, the tension adjustment mechanisms 143 and 144 prevent an excessive load from acting on the linear motors 110 and 116.

In a state where the lens apparatus (fixed barrel 100) is tilted with respect to a horizontal direction, and the variator lens 103 and the compensator lens 119 are rested, the length adjusting mechanisms 111 and 127 are locked and the rotation of the pulleys in these mechanisms 111 and 127 is stopped. In this state, moments generated by the wire tensions and acting on the two-step pulleys 112 and 126 balance each other, which prevents rotation of the two-step pulleys 112 and 126 to maintain their rested state. Accordingly, the variator lens 103 and the compensator lens 119 also maintain a rested state. In other words, electric power is hardly consumed to maintain the rested state of the variator lens 103 and compensator lens 119 while their optical axis directions are tilted with respect to the horizontal direction.

This embodiment has described the case where the length adjustment mechanisms 111 and 127 operate in the vertical direction orthogonal to the optical axis 102. However, the length adjustment mechanisms 111 and 127 may operate in other directions orthogonal to the optical axis 102 such as a direction orthogonal to a paper surface of FIG. 9, or may be disposed such that a longitudinal direction of each of the length adjustment mechanisms 111 and 127 is parallel to the optical axis direction.

Moreover, this embodiment has described the case where the linear motors and the linear encoders are used respectively as the actuators and the position detectors. However, other actuators and other position detectors may be used. For example, as the position detector to be used when the movement distance of the optical axis is long, not only the linear encoder, but also a laser displacement meter may be used. As the actuator, direct driving actuators such as a voicecoil motor and a linear motor are desirable. However, a combination of a DC motor and a ball screw and a combination of the DC motor and a cam may be employed.

Furthermore, this embodiment has described the linking mechanism that is configured by using the pulleys and the flexible linking members wound around the pulleys. However, the linking mechanism is not limited thereto. That is, any linking mechanism can be used as long as it links the first and second optical units such that one thereof becomes a counterweight to provide an obliquely upward force acting on the other optical unit in the obliquely upward direction.

In addition, although this embodiment has described the lens apparatus as the optical apparatus, alternative embodiments of the present invention include optical apparatuses including at least two movable optical units, other than the lens apparatus.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2010-171770 filed on Jul. 30, 2010, which is hereby incorporated by reference herein in its entirety.

What is claimed is:

1. An optical apparatus comprising:
   a first optical unit and a second optical unit that are movable in an optical axis direction;
   actuators that respectively move the first and second optical units in the optical axis direction; and
   a linking mechanism that is configured to link the first and second optical units with each other such that, in a state where the optical axis direction is tilted with respect to a horizontal direction and thereby an obliquely downward force caused by gravity acts on each of the first and second optical units in an obliquely downward direction, one of the first or second optical unit works as a counterweight to provide an obliquely upward force acting on the other of the first or second optical unit in an obliquely upward direction.

2. An optical apparatus according to claim 1, wherein the linking mechanism includes:
   a first rotatable member and a second rotatable member that are rotatable integrally with each other or in conjunction with each other;
   a first wound linking member that is wound around the first rotatable member and connected to the first optical unit; and
   a second wound linking member that is wound around the second rotatable member and connected to the second optical unit,
   wherein a ratio of diameters of the first and second rotatable members is set such that a first value is closer to 1 than a second value,
   wherein the first value is obtained by dividing a larger one of (a) a product of a mass of the first optical unit and a rotational radius of the first rotatable member and (b) a product of a mass of the second optical unit and a rotational radius of the second rotatable member by the other smaller one, and
   wherein the second value is obtained by dividing a heavier one of the masses of the first and second optical units by the other lighter one.

3. An optical apparatus according to claim 2, wherein the linking mechanism includes a mechanism to change a length of at least one of the first wound linking member or the second wound linking member when being projected toward an optical axis.

4. An optical apparatus according to claim 1, wherein:
   the first optical unit is moved in the optical axis direction for variation of magnification, and the second optical unit is moved in the optical axis direction for reducing image plane variation caused due to the variation of magnification, and
   the optical apparatus further comprises:
   a first position detector configured to detect a position of the first optical unit;
   a second position detector configured to detect a position of the second optical unit;
   a memory configured to store a target positional relationship of the first and second optical units; and
   a controller configured to drive the actuators by using detection results of the first and second position detectors such that the positions of the first and second optical units become closer to the target positional relationship.

* * * * *